(12) United States Patent
Doddi et al.

(10) Patent No.: US 7,831,528 B2
(45) Date of Patent: Nov. 9, 2010

(54) OPTICAL METROLOGY OF STRUCTURES FORMED ON SEMICONDUCTOR WAFERS USING MACHINE LEARNING SYSTEMS

(75) Inventors: Srinivas Doddi, Fremont, CA (US);
Emmanuel Drege, San Jose, CA (US);
Nickhil Jakatdar, Los Altos, CA (US);
Junwei Bao, Palo Alto, CA (US)

(73) Assignee: Tokyo Electron Limited, Tokyo (JP)

( * ) Notice: Subject to any disclaimer, the term of this patent is extended or adjusted under 35 U.S.C. 154(b) by 105 days.

(21) Appl. No.: 12/399,011

(22) Filed: Mar. 5, 2009

(65) Prior Publication Data
US 2009/0198635 A1    Aug. 6, 2009

Related U.S. Application Data

(63) Continuation of application No. 10/608,300, filed on Jun. 27, 2003, now abandoned.

(51) Int. Cl.
*G06F 15/18* (2006.01)
*G01R 31/26* (2006.01)
*G01R 31/303* (2006.01)

(52) U.S. Cl. .............................. 706/12; 706/20; 706/22; 438/16

(58) Field of Classification Search .................... 706/12
See application file for complete search history.

(56) References Cited

U.S. PATENT DOCUMENTS 6,558,965 B1 * 5/2003 Singh et al. .................... 438/14
2003/0200063 A1 * 10/2003 Niu et al. ........................ 703/2

OTHER PUBLICATIONS

White, Multivariate Analysis of Spectral Measurements for the Characterization of Semiconductor Processes, Massachusetts Institute of Technology Aug. 31, 2001.*

* cited by examiner

*Primary Examiner*—Michael B. Holmes
*Assistant Examiner*—Nathan H Brown, Jr.
(74) *Attorney, Agent, or Firm*—Manuel B. Madriaga

(57) ABSTRACT

A structure formed on a semiconductor wafer is examined by obtaining a first diffraction signal measured using a metrology device. A second diffraction signal is generated using a machine learning system, where the machine learning system receives as an input one or more parameters that characterize a profile of the structure to generate the second diffraction signal. The first and second diffraction signals are compared. When the first and second diffraction signals match within a matching criterion, a feature of the structure is determined based on the one or more parameters or the profile used by the machine learning system to generate the second diffraction signal.

29 Claims, 6 Drawing Sheets

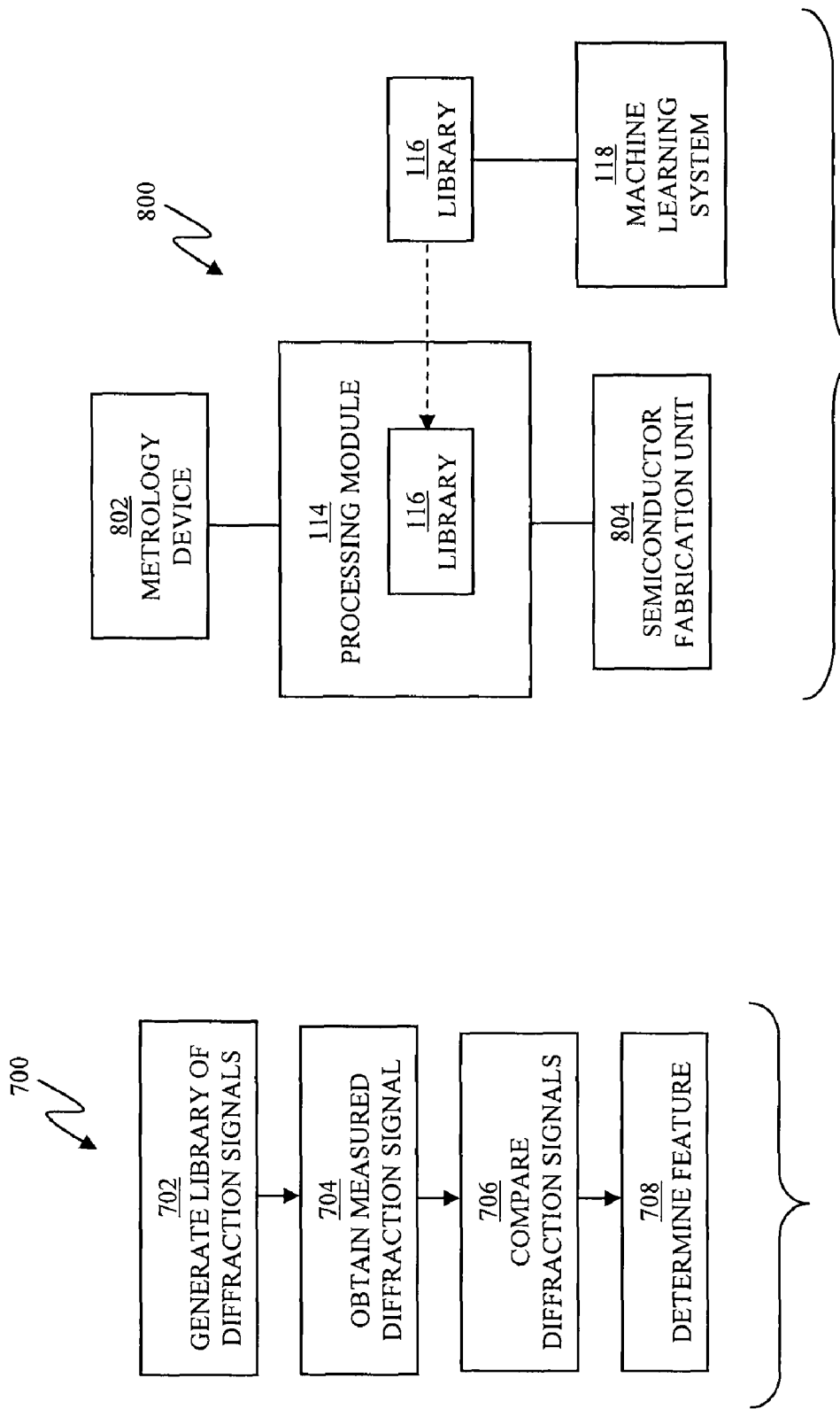

OPTICAL METROLOGY OF STRUCTURES FORMED ON SEMICONDUCTOR WAFERS USING MACHINE LEARNING SYSTEMS

CROSS-REFERENCE TO RELATED APPLICATIONS

This application is a Continuation application of U.S. patent application Ser. No. 10/608,300, entitled OPTICAL METROLOGY OF STRUCTURES FORMED ON SEMICONDUCTOR WAFER USING MACHINE LEARNING SYSTEMS, filed on Jun. 27, 2003, which is incorporated herein by reference in its entirety.

BACKGROUND

1. Field of the Invention

The present invention relates to metrology of structures formed on semiconductor wafers, and more particularly to metrology of structures formed on semiconductor wafers using machine learning systems.

2. Related Art

Optical metrology involves directing an incident beam at a structure, measuring the resulting diffracted beam, and analyzing the diffracted beam to determine a feature of the structure. In semiconductor manufacturing, optical metrology is typically used for quality assurance. For example, after fabricating a periodic grating in proximity to a semiconductor chip on a semiconductor wafer, an optical metrology system is used to determine the profile of the periodic grating. By determining the profile of the periodic grating, the quality of the fabrication process utilized to form the periodic grating, and by extension the semiconductor chip proximate the periodic grating, can be evaluated.

One conventional optical metrology system uses a diffraction modeling technique, such as rigorous coupled wave analysis (RCWA), to analyze the diffracted beam. More particularly, in the diffraction modeling technique, a model diffraction signal is calculated based, in part, on solving Maxwell's equations. Calculating the model diffraction signal involves performing a large number of complex calculations, which can be time consuming and costly.

SUMMARY

In one exemplary embodiment, a structure formed on a semiconductor wafer is examined by obtaining a first diffraction signal measured using a metrology device. A second diffraction signal is generated using a machine learning system, where the machine learning system receives as an input one or more parameters that characterize a profile of the structure to generate the second diffraction signal. The first and second diffraction signals are compared. When the first and second diffraction signals match within a matching criterion, a feature of the structure is determined based on the one or more parameters or the profile used by the machine learning system to generate the second diffraction signal.

DESCRIPTION OF DRAWING FIGURES

Figure 1:
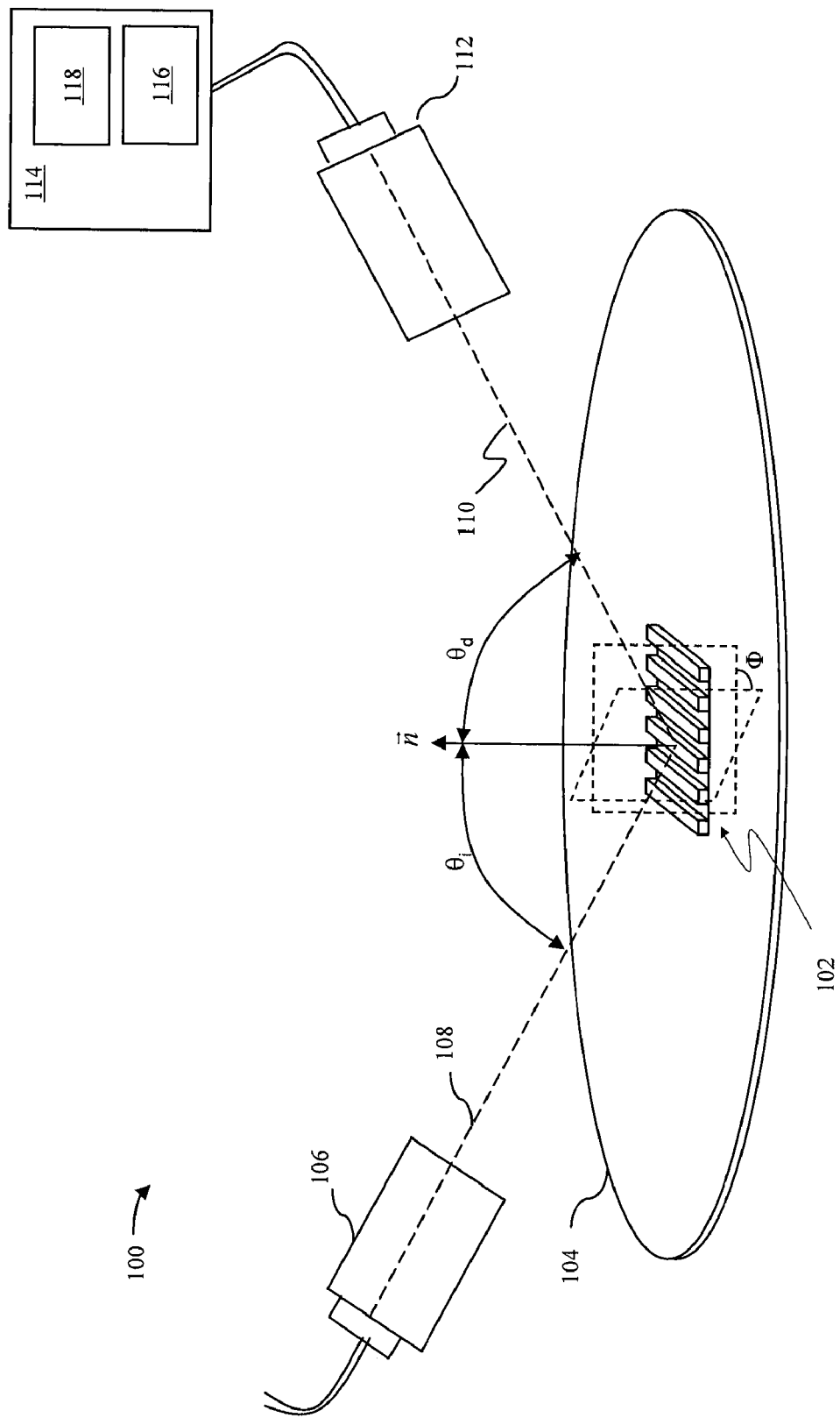
Figure 4:
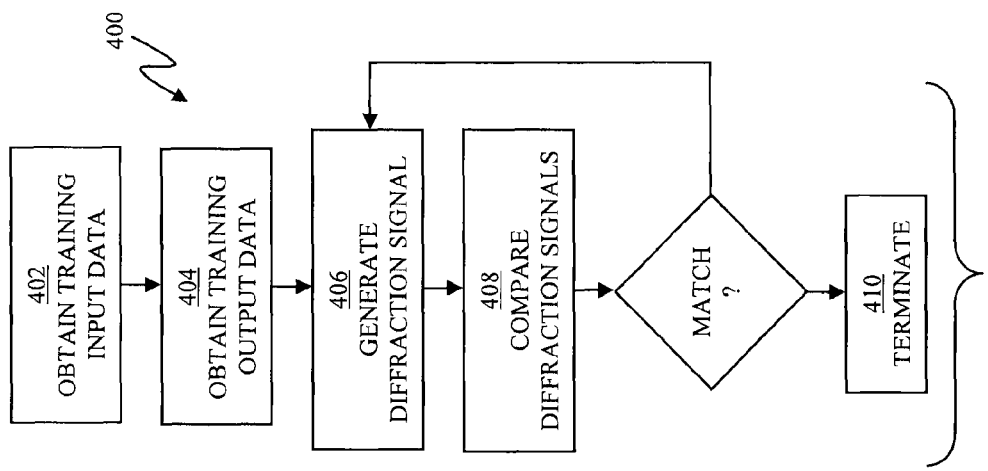
Figure 6:
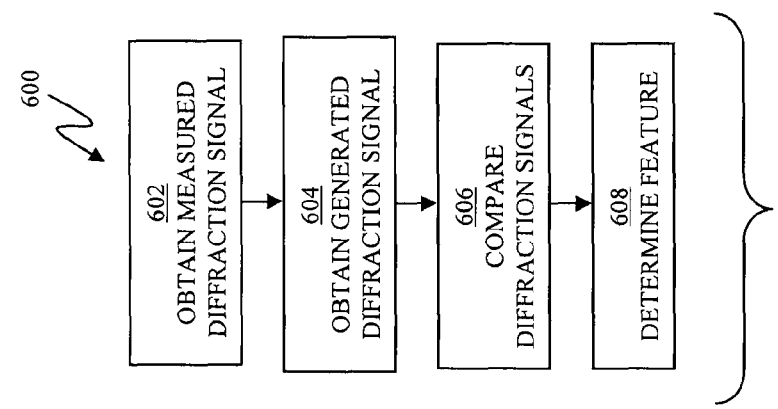
Figure 5:
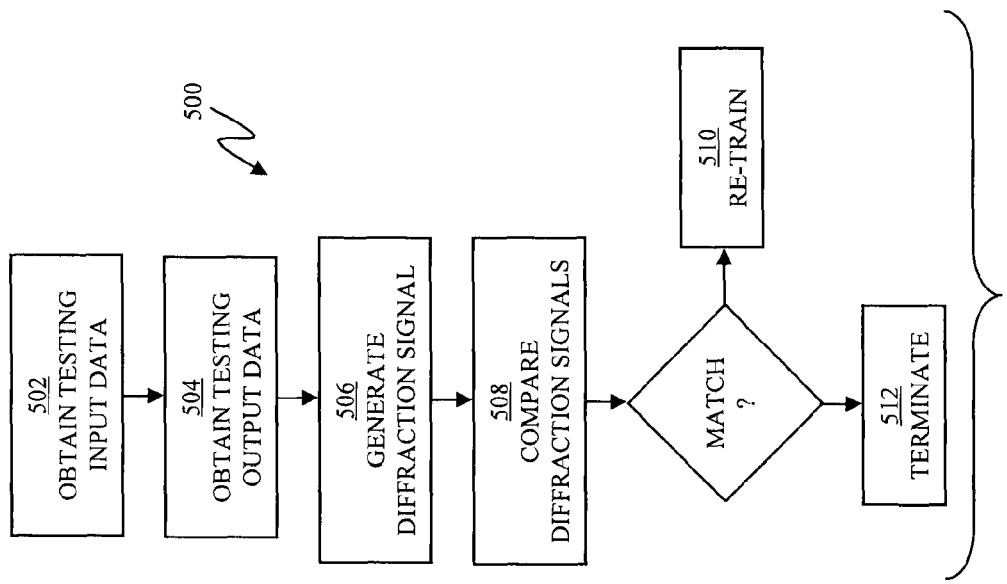
Figure 10:
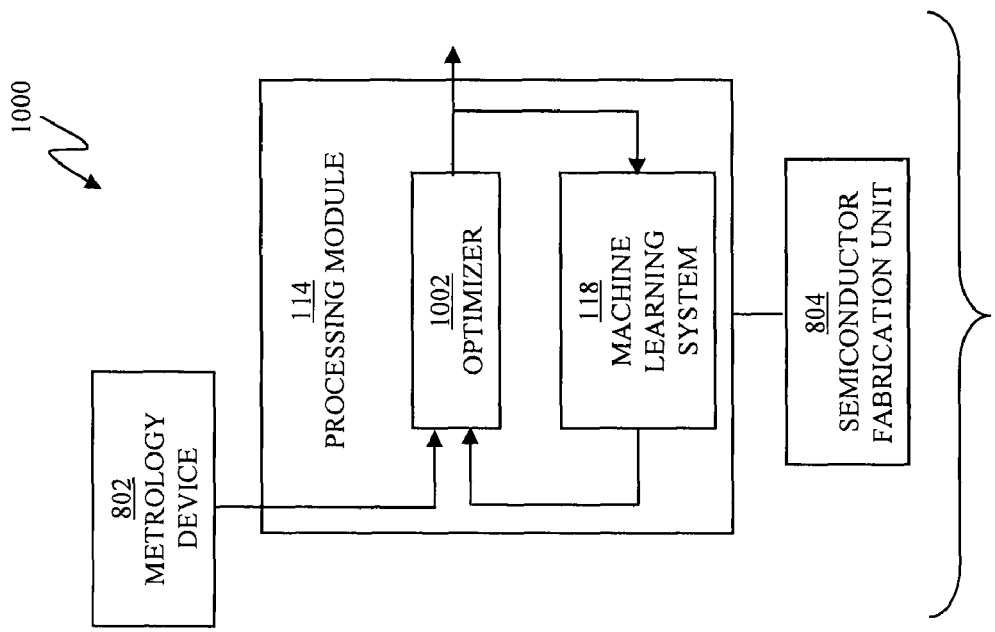
Figure 9:
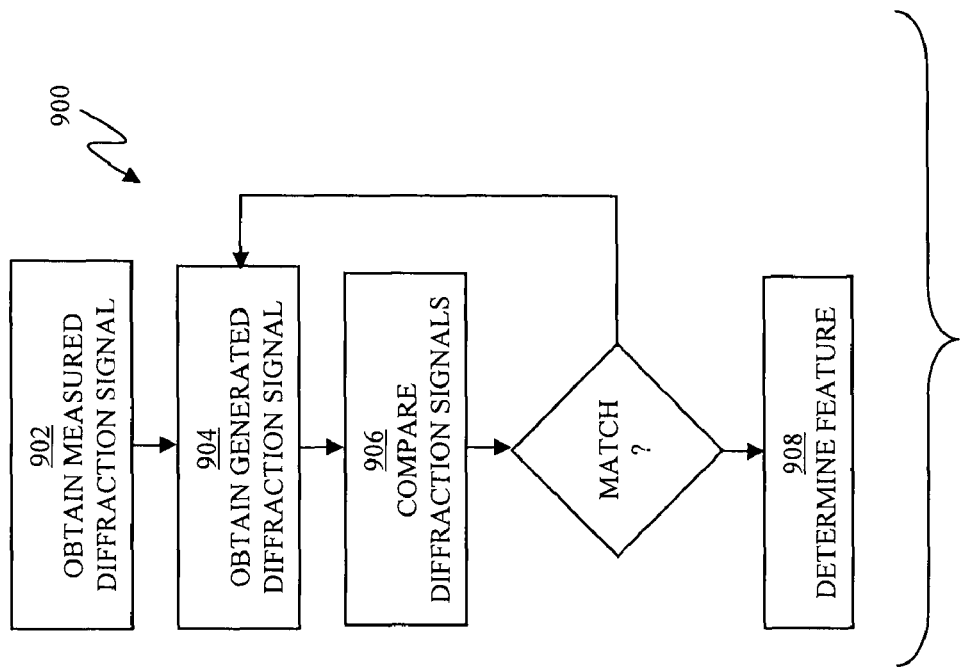

The present invention can be best understood by reference to the following description taken in conjunction with the accompanying drawing figures, in which like parts may be referred to by like numerals:

FIG. 1 depicts an exemplary optical metrology system;
FIGS. 2A-2E depict exemplary profiles;
FIG. 3 depicts an exemplary neural network;
FIG. 4 depicts an exemplary process of training a machine learning system;
FIG. 5 depicts an exemplary process of testing a machine learning system;
FIG. 6 depicts an exemplary process of determining a feature of a structure using a machine learning system;
FIG. 7 depicts an exemplary process of determining a feature of a structure using a machine learning system in a library-based process;
FIG. 8 depicts an exemplary system to determine a feature of a structure using a machine learning system in a library-based system;
FIG. 9 depicts an exemplary process of determining a feature of a structure using a machine learning system in a regression-based process; and
FIG. 10 depicts an exemplary system to determine a feature of a structure using a machine learning system in a regression-based system.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Metrology

With reference to FIG. 1, a metrology system 100 can be used to examine and analyze a structure. For example, metrology system 100 can be used to determine a feature of a periodic grating 102 formed on wafer 104. As described earlier, periodic grating 102 can be formed in test areas on wafer 104, such as adjacent to a device formed on wafer 104. Alternatively, periodic grating 102 can be formed in an area of the device that does not interfere with the operation of the device or along scribe lines on wafer 104.

As depicted in FIG. 1, metrology system 100 can include a metrology device with a source 106 and a detector 112. Periodic grating 102 is illuminated by an incident beam 108 from source 106. In the present exemplary embodiment, incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal $\vec{n}$ and is received by detector 112. Detector 112 converts the diffracted beam 110 into a measured diffraction signal, which can include reflectance, tan ($\Psi$), cos ($\Delta$), Fourier coefficients, and the like.

Metrology system 100 also includes a processing module 114 configured to receive the measured diffraction signal and analyze the measured diffraction signal. As described below, a feature of periodic grating 102 can then be determined using a library-based process or a regression-based process. Additionally, other linear or non-linear profile extraction techniques are contemplated.

2. Library-Based Process

In a library-based process, the measured diffraction signal is compared to a library of diffraction signals. More specifically, each diffraction signal in the library is associated with a profile of the structure. When a match is made between the measured diffraction signal and one of the diffraction signals in the library or when the difference of the measured diffraction signal and one of the diffraction signals in the library is within a preset or matching criterion, the profile associated with the matching diffraction signal in the library is presumed to represent the actual profile of the structure. A feature of the structure can then be determined based on the profile associated with the matching diffraction signal.

Thus, with reference again to FIG. 1, in one exemplary embodiment, after obtaining a measured diffraction signal, processing module 114 compares the measured diffraction signal to diffraction signals stored in a library 116. Each diffraction signal in library 116 is associated with a profile. When a match is made between the measured diffraction signal and one of the diffraction signals in library 116, the profile associated with the matching diffraction signal in library 116 can be presumed to represent the actual profile of periodic grating 102.

The set of profiles stored in library 116 can be generated by characterizing a profile using a set of parameters, then varying the set of parameters to generate profiles of varying shapes and dimensions. The process of characterizing a profile using a set of parameters can be referred to as parameterizing.

Figure 2E:
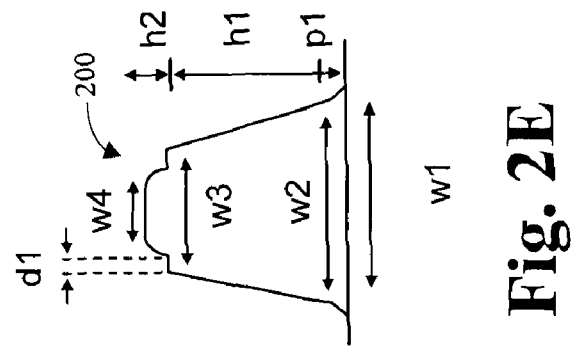
Figure 2C:
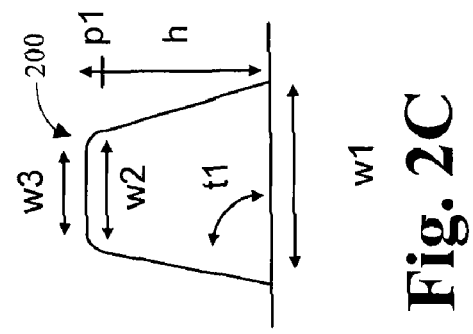
Figure 2D:
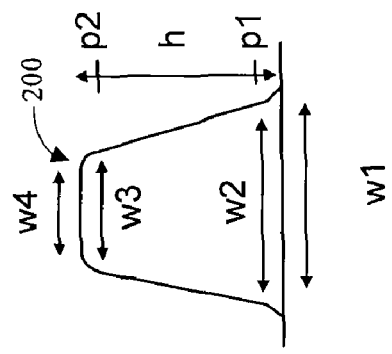
Figure 2A:
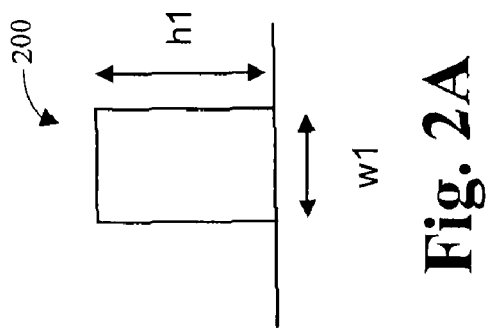
Figure 2B:
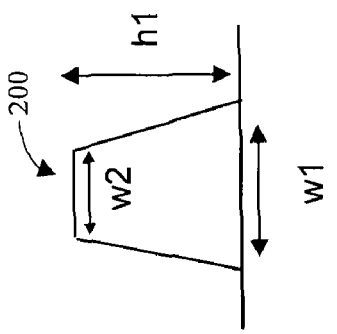
Figure 3:
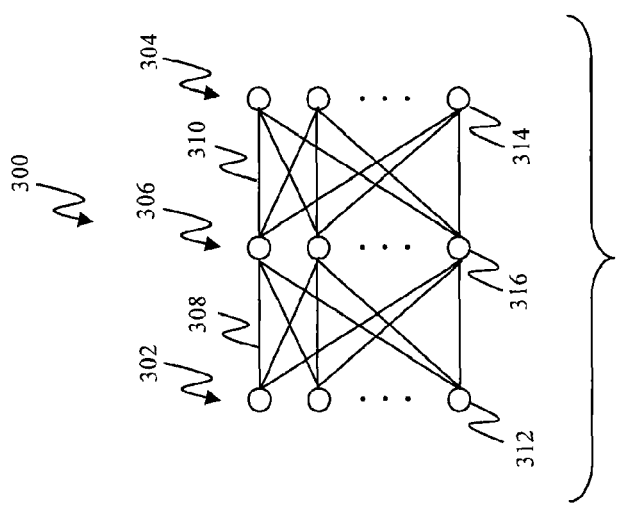

For example, as depicted in FIG. 2A, assume that profile 200 can be characterized by parameters h1 and w1 that define its height and width, respectively. As depicted in FIGS. 2B to 2E, additional shapes and features of profile 200 can be characterized by increasing the number of parameters. For example, as depicted in FIG. 2B, profile 200 can be characterized by parameters h1, w1, and w2 that define its height, bottom width, and top width, respectively. Note that the width of profile 200 can be referred to as the critical dimension (CD). For example, in FIG. 2B, parameter w1 and w2 can be described as defining the bottom CD and top CD, respectively, of profile 200. It should be recognized that various types of parameters can be used to characterize profile 200, including angle of incident (AOI), pitch, n & k, hardware parameters (e.g., polarizer angle), and the like.

As described above, the set of profiles stored in library 116 (FIG. 1) can be generated by varying the parameters that characterize the profile. For example, with reference to FIG. 2B, by varying parameters h1, w1, and w2, profiles of varying shapes and dimensions can be generated. Note that one, two, or all three parameters can be varied relative to one another.

Thus, the parameters of the profile associated with a matching diffraction signal can be used to determine a feature of the structure being examined. For example, a parameter of the profile corresponding to a bottom CD can be used to determine the bottom CD of the structure being examined.

With reference again to FIG. 1, the number of profiles and corresponding diffraction signals in the set of profiles and diffraction signals stored in library 116 (i.e., the resolution and/or range of library 116) depends, in part, on the range over which the set of parameters and the increment at which the set of parameters are varied. In one exemplary embodiment, the profiles and the diffraction signals stored in library 116 are generated prior to obtaining a measured diffraction signal from an actual structure. Thus, the range and increment (i.e., the range and resolution) used in generating library 116 can be selected based on familiarity with the fabrication process for a structure and what the range of variance is likely to be. The range and/or resolution of library 116 can also be selected based on empirical measures, such as measurements using atomic force microscopy (AFM), scanning electron microscopy (SEM), and the like.

For a more detailed description of a library-based process, see U.S. patent application Ser. No. 09/907,488, titled GENERATION OF A LIBRARY OF PERIODIC GRATING DIFFR5TION SIGNALS, filed on Jul. 16, 2001, which is incorporated herein by reference in its entirety.

3. Regression-Based Process

In a regression-based process, the measured diffraction signal is compared to a diffraction signal generated prior to the comparison (i.e., a trial diffraction signal) using a set of parameters (i.e., trial parameters) for a profile. If the measured diffraction signal and the trial diffraction signal do not match or when the difference of the measured diffraction signal and the trial diffraction signal is not within a preset or matching criterion, another trial diffraction signal is generated using another set of parameters for another profile, then the measured diffraction signal and the newly generated trial diffraction signal are compared. When the measured diffraction signal and the trial diffraction signal match or when the difference of the measured diffraction signal and the trial diffraction signals is within a preset or matching criterion, the profile associated with the matching trial diffraction signal is presumed to represent the actual profile of the structure. The profile associated with the matching trail diffraction signal can then be used to determine a feature of the structure being examined.

Thus, with reference again to FIG. 1, in one exemplary embodiment, processing module 114 can generate a trial diffraction signal for a profile, and then compare the measured diffraction signal to the trial diffraction signal. As described above, if the measured diffraction signal and the trial diffraction signal do not match or when the difference of the measured diffraction signal the trial diffraction signals is not within a preset or matching criterion, then processing module 114 can iteratively generate another trial diffraction signal for another profile. In one exemplary embodiment, the subsequently generated trial diffraction signal can be generated using an optimization algorithm, such as global optimization techniques, which includes simulated annealing, and local optimization techniques, which includes steepest descent algorithm.

In one exemplary embodiment, the trial diffraction signals and profiles can be stored in a library 116 (i.e., a dynamic library). The trial diffraction signals and profiles stored in library 116 can then be subsequently used in matching the measured diffraction signal. Alternatively, library 116 can be omitted from metrology system 100.

For a more detailed description of a regression-based process, see U.S. patent application Ser. No. 09/923,578, titled METHOD AND SYSTEM OF DYNAMIC LEARNING THROUGH A REGRESSION-BASED LIBRARY GENERATION PROCESS, filed on Aug. 6, 2001, which is incorporated herein by reference in its entirety.

4. Machine Learning Systems

With reference to FIG. 1, in one exemplary embodiment, diffraction signals used in a library-based process and/or a regression-based process are generated using a machine learning system 118 employing a machine learning algorithm, such as back-propagation, radial basis function, support vector, kernel regression, and the like. For a more detailed description of machine learning systems and algorithms, see "Neural Networks" by Simon Haykin, Prentice Hall, 1999, which is incorporated herein by reference in its entirety.

In the present exemplary embodiment, machine learning system 118 receives a profile as an input and generates a diffraction signal as an output. Although in FIG. 1 machine learning system 118 is depicted as a component of processing module 114, it should be recognized that machine learning system 118 can be a separate module. Moreover, when machine learning system 118 is used as part of a library-based process, the diffraction signals in library 116 can be generated in advance by machine learning system 118. As such, machine learning system 118 can be a separate module that is not connected to processing module 114. In contrast, when machine learning system 118 is used as part of a regression-based process, machine learning system 118 is connected to processing module 114 even when machine learning system 118 is a separate module rather than a component of processing module 114.

With reference to FIG. 3, in one exemplary implementation, the machine learning system is a neural network 300 using a back-propagation algorithm. Neural network 300 includes an input layer 302, an output layer 304, and a hidden layer 306 between input layer 302 and output layer 304. Input layer 302 and hidden layer 306 are connected using links 308. Hidden layer 306 and output layer 304 are connected using links 310. It should be recognized, however, that neural network 300 can include any number of layers connected in various configurations.

As depicted in FIG. 3, input layer 302 includes one or more input nodes 312. In the present exemplary implementation, an input node 312 in input layer 302 corresponds to a parameter of the profile that is inputted into neural network 300. Thus, the number of input nodes 312 corresponds to the number of parameters used to characterize the profile. For example, if a profile is characterized using 2 parameters (e.g., top and bottom widths), input layer 302 includes 2 input nodes 312, where a first input node 312 corresponds to a first parameter (e.g., a top width) and a second input node 312 corresponds to a second parameter (e.g., a bottom width).

In neural network 300, output layer 304 includes one or more output nodes 314. In the present exemplary implementation, each output node 314 is a linear function. It should be recognized, however, that each output node 314 can be various types of functions. Additionally, in the present exemplary implementation, an output node 314 in output layer 304 corresponds to a dimension of the diffraction signal that is outputted from neural network 300. Thus, the number of output nodes 314 corresponds to the number of dimensions used to characterize the diffraction signal. For example, if a diffraction signal is characterized using 5 dimensions corresponding to, for example, 5 different wavelengths, output layer 304 includes 5 output nodes 314, wherein a first output node 314 corresponds to a first dimension (e.g., a first wavelength), a second output node 314 corresponds to a second dimension (e.g., a second wavelength), etc.

In neural network 300, hidden layer 306 includes one or more hidden nodes 316. In the present exemplary implementation, each hidden node 316 is a sigmoidal transfer function or a radial basis function. It should be recognized, however, that each hidden node 316 can be various types of functions. Additionally, in the present exemplary implementation, the number of hidden nodes 316 is determined based on the number of output nodes 314. More particularly, the number of hidden nodes 316 (m) is related to the number of output nodes 314 (n) by a predetermined ratio (r=m/n). For example, when r=10, there are 10 hidden nodes 316 for each output node 314. It should be recognized, however, that the predetermined ratio can be a ratio of the number of output nodes 314 to the number of hidden nodes 316 (i.e., r=n/m). Additionally, it should be recognized that the number of hidden nodes 316 in neural network 300 can be adjusted after the initial number of hidden nodes 316 is determined based on the predetermined ratio. Furthermore, the number of hidden nodes 316 in neural network 300 can be determined based on experience and/or experimentation rather than based on the predetermined ratio.

Prior to using a machine learning system to generate a diffraction signal, the machine learning system is trained. With reference to FIG. 4, an exemplary process 400 is depicted for training a machine learning system. In exemplary process 400, the machine learning system is trained using a set of training input data and a set of training output data, where an input data in the set of training input data has a corresponding output data in the set of training output data to form an input and an output data pair.

In 402, the set of training input data is obtained. In the present exemplary embodiment, the training input data includes a set of profiles. As described above, a profile is characterized using a set of parameters. A range of profiles can be generated by varying one or more parameters that characterize a profile, either alone or in combination. An overall range of profiles to be generated is determined based on the expected range of variability in the actual profile of the structure to be examined, which is determined either empirically or through experience. For example, if the actual profile of the structure to be examined is expected to have a bottom width that can vary between $x_1$ and $x_2$, then the overall range of profiles can be generated by varying the parameter corresponding to the bottom width between $x_1$ and $x_2$.

In one exemplary implementation, the set of profiles used to train the machine learning system is selected from the overall range of profiles to be generated. More particularly, the training data set is selected using a random sampling of the overall range of profiles. It should be recognized that various sampling techniques can be used to select the training data set, such as systematic sampling, a combination of random and systematic sampling, and the like.

In the present exemplary implementation, the overall range of profiles to be generated is divided into two or more partitions. A machine learning system is configured and trained for each of the partitions. For example, assume the overall range is divided into a first partition and a second partition. Thus, in this example, a first machine learning system is configured and trained for the first partition, and a second machine learning system is configured and trained for the second partition. One advantage of partitioning the overall range and using multiple machine learning systems is that parallel processing can be used (e.g., the two machine learning systems can be trained and used in parallel). Another advantage is that each of the machine learning systems may be more accurate as to their respective partitions than a single machine learning system for the overall range. More specifically, a single machine learning system trained for the overall range may be susceptible to a local minimum that may reduce the accuracy of the machine learning system.

When the overall range is partitioned, the partitions may be of equal sizes or of varying sizes. When the partitions are of varying sizes, the sizes of the partitions can be determined based on the density of the data within the partitions. For example, a less dense partition may be larger than a more dense partition. It should be recognized that the number and size of the partitions can vary depending on the application.

In 404, the set of training output data is obtained. In the present exemplary embodiment, the training output data includes a set of diffraction signals. A diffraction signal in the set of diffraction signals used as the training output data corresponds to a profile in the set of profiles used as the training input data. Each diffraction signal in the set of diffraction signals can be generated based on each profile in the set of profiles using a modeling technique, such as rigorous coupled wave analysis (RCWA), integral method, Fresnel method, finite analysis, modal analysis, and the like. Alternatively, each diffraction signal in the set of diffraction signals can be generated based on each profile in the set of profiles using an empirical technique, such as measuring a diffraction signal using a metrology device, such as an ellipsometer, reflectometer, atomic force microscope (AFM), scanning electron microscope (SEM), and the like. Thus, a profile from the set of profiles and the corresponding diffraction signal from the set of diffraction signals form a profile/diffraction signal pair. Although there is a one-to-one correspondence between a profile and a diffraction signal in the profile/diffraction signal pair, note that there does not need to be a known relation, either analytic or numeric, between the profile and the diffraction signal in the profile/diffraction signal pair.

In one exemplary implementation, prior to using the set of diffraction signals to train the machine learning system, the set of diffraction signals is transformed using principal component analysis (PCA). More particularly, a diffraction signal can be characterized using a number of dimensions, such as a number of different wavelengths. By using PCA to transform the set of diffraction signals, the diffraction signals are transformed into uncorrelated dimensions, and the space of the uncorrelated dimensions is smaller than the space of the original dimensions. After the machine learning system has been trained, the diffraction signals can be transformed back.

In the present exemplary implementation, the dimensions of the diffraction signals can be divided into two or more partitions. A machine learning system is configured and trained for each of the partitions. For example, assume the dimensions are divided into a first partition and a second partition. Thus, in this example, a first machine learning system is configured and trained for the first partition, and a second machine learning system is configured and trained for the second partition. Again, one advantage of partitioning the dimensions and using multiple machine learning systems is that parallel processing can be used (e.g., the two machine learning systems can be trained and used in parallel). Another advantage is that each of the machine learning systems may be more accurate as to their respective partitions than a single machine learning system.

In 406, for a profile from the set of profiles used as the training input data, a diffraction signal is generated using the machine learning system. In 408, the generated diffraction signal is compared with the diffraction signal from the set of diffraction signals that corresponds to the profile. When the difference between the diffraction signals are not within a desired or predetermined margin of error, 406 and 408 are repeated with another profile from the set of profiles used as the training input data. In 410, when the difference between the diffraction signals are within a desired or predetermined margin of error, the training process is terminated.

It should be recognized that training process 400 can include the use of an optimization technique, such as gradient descent, linear programming, quadratic programming, simulated annealing, Marquardt-Levenberg algorithm, and the like. Additionally, training process 400 can be performed as a batch process. For a more detailed description of a batch process, see "Neural Networks" by Simon Haykin, which has been cited above.

Furthermore, training process 400 depicted in FIG. 4 illustrates a back-propagation algorithm. However, it should be recognized that various training algorithms can be used, such as radial basis network, support vector, kernel regression, and the like.

With reference to FIG. 5, an exemplary process 500 is depicted for testing a machine learning system. In one exemplary embodiment, after a machine learning system has been trained, the machine learning system can be tested to confirm that it has been properly trained. It should be recognized, however, that this testing process can be omitted in some applications.

In 502, a set of testing input data is obtained. In 504, a set of testing output data is obtained. In the present exemplary embodiment, the testing input data includes a set of profiles, and the testing output data includes a set of diffraction signals. The set of testing input data and set of testing output data can be obtained using the same process and techniques described above during the training process. The set of testing input data and set of testing output data can be the same as or a subset of the training input data and training output data. Alternatively, the set of testing input data and set of testing out data can be different than the training input data and training output data.

In 506, for a profile from the set of profiles used as the testing input data, a diffraction signal is generated using the machine learning system. In 508, the generated diffraction signal is compared with the diffraction signal from the set of diffraction signals in the testing output data that corresponds to the profile. In 510, when the difference between the diffraction signals are not within a desired or predetermined margin of error, the machine learning system is re-trained. When the machine learning system is re-trained, the training process can be adjusted. For example, the selection and number of the training input and output variables can be adjusted. Additionally, the machine learning system can be adjusted. For example, when the machine learning system is a neural network, as described above, the number of hidden nodes can be adjusted. In 512, when the difference between the diffraction signals are within a desired or predetermined margin of error, the testing process is terminated.

An empirical risk minimization (ERM) technique can be used to quantify how well the trained machine learning system can generalize to new input. For a more detailed description of ERM, see "Statistical Learning Theory" by Vladimir N. Vapnik, Wiley-Interscience, September 1998, which is incorporated herein by reference in its entirety.

After the machine learning system has been trained and tested, the machine learning system can be used to generate diffraction signals for use in analyzing a structure formed on a semiconductor wafer. Again, it should be noted that the testing process can be omitted in some applications.

With reference to FIG. 6, an exemplary process 600 is depicted for using a machine learning system to examine a structure formed on a semiconductor wafer. In 602, a measured diffraction signal of the structure is obtained by using a metrology device. In 604, a generated diffraction signal is obtained using the machine learning system. In 606, the diffraction signals are compared. In 608, a feature of the structure is determined based on the comparison of the measured and generated diffraction signals.

More particularly, as described above, a profile corresponding to the generated diffraction signal is used as an input to the machine learning system to generate the generated diffraction signal. The profile is characterized by one or more parameters. Thus, when the generated diffraction signal matches the measured diffraction signal within a matching criterion, the profile, and thus the one or more parameters that characterize the profile, can be used to determine a feature of the structure.

With reference to FIG. 7, an exemplary process 700 is depicted for using a machine learning system in a library-based process. In 702, a library of diffraction signals are generated using the machine learning system. More particularly, the library of diffraction signals is generated by inputting a range of profiles into the machine learning system. In 704, a measured diffraction signal is obtained using a metrology device, such as an ellipsometer, reflectometer, and the like. In 706, the measured diffraction signal is compared to the diffraction signals in the library of diffraction signals generated using the machine learning system. In 708, a feature of the structure is determined using the profile corresponding to the matching diffraction signal from the library of diffraction signals.

With reference to FIG. 8, an exemplary system 800 is depicted for using a machine learning system in a library-based system. As depicted in FIG. 8, library 116 is generated using machine learning system 118. Library 116 is then used by processing module 114 to compare the diffraction signals in library 116 to measured diffraction signals obtained from a metrology device 802, such as an ellipsometer, a reflectometer, and the like. It should be noted that although machine learning system 118 is depicted as a separate unit in FIG. 8, machine learning system 118 can be integrated as a component of processing module 114. Additionally, machine learning system 118 can be connected to processing module 114 to transmit library 116 to processing module 114, such as through a network connection. Alternatively, library 116 can be stored on a portable storage medium and physically transported to processing module 114.

Furthermore, as depicted in FIG. 8, processing module 114 can be coupled to a semiconductor fabrication unit 804 that is configured to perform one or more fabrication steps. It should be recognized, however, that the metrology system can operate as a stand-alone system in addition to being integrated with semiconductor fabrication unit 804.

With reference to FIG. 9, an exemplary process 900 is depicted for using a machine learning system in a regression-based process. In 902, a measured diffraction signal is obtained using a metrology device, such as an ellipsometer, reflectometer, atomic force microscope (AFM), scanning electron microscope (SEM), and the like. In 904, a generated diffraction signal is obtained using the machine learning system. In 906, the two diffraction signals are compared. When the two diffraction signals do not match within a predetermined matching criterion, 904 and 906 are repeated with another diffraction signal generated in 904. This process is iterated until a match is found, meaning that the generated and measured diffraction signals match within the predetermined matching criterion. In 908, if the two diffraction signals match within a predetermined matching criterion, the profile corresponding to the matching diffraction signal is assumed to correspond to the actual profile of the structure being examined. Thus, the profile and the parameters that characterize the profile can be used to determine a feature of the structure.

With reference to FIG. 10, an exemplary system 1000 is depicted for using a machine learning system in a regression-based system. As depicted in FIG. 10, an optimizer 1002 receives the measured diffraction signal as an input from metrology device 802. Optimizer 1002 receives the generated diffraction signal as an input from machine learning system 118. Optimizer 1002 compares the generated and the measured diffraction signals. When the generated and measured diffraction signals do match, optimizer 1002 outputs the profile corresponding to the matching generated diffraction signal. When the generated and measured diffraction signals do not match within a predetermined matching criterion, optimizer 1002 outputs a signal to machine learning system 118 to generate another diffraction signal. This process is iterated until a match is found, meaning that the generated and measured diffraction signals match within the predetermined matching criterion.

In one exemplary embodiment, an optimization technique is used to reduce the number of iterations needed to arrive at a match. More particularly, the aim of an optimization problem is to find a best solution among several possible solutions, where the best solution can be quantified by associating a cost function. In other words, for a given problem under a given cost metric, the task is to find a solution with the least cost. Thus, in the present exemplary application, the task is to find the profile with a corresponding diffraction signal that produces the least cost (under a given cost metric) with respect to the given measured diffraction signal. It should be recognized that numerous optimization techniques, which are broadly classified into two categories (i.e., global and local), are known and can be used, such as gradient descent, linear programming, quadratic programming, simulated annealing, Marquardt-Levenberg algorithm, and the like. For a more detailed description of global and local optimization techniques, see "Numerical Recipes in C", by William H. Press, Saul A. Teukolsky, William T. Vetterling and Brian P. Flannery, Second Edition, Cambridge, which is incorporated herein by reference.

As described above, a library of diffraction signals can be generated as part of a regression-based process. More particularly, when a match has been made, meaning that the generated diffraction signal and the measured diffraction signal match within the matching criterion, a library of diffraction signals can be generated around the matching profile. Generally, the library of diffraction signals generated as part of the regression-based process is smaller than the library that is generated as part of the library-based process described above.

Additionally, the library of diffraction signals generated as part of a regression-based process and the library generated as part of a library-based process described above can be used in an interpolation process, where a solution is derived between two entries in the library. For a more detailed description of an interpolation process, see U.S. patent application Ser. No. 10/075,904, titled PROFILE REFINEMENT FOR INTEGRATED CIRCUIT METROLOGY, filed on Feb. 12, 2002, which is incorporated herein by reference in its entirety.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching.

For example, with reference to FIG. 1, as described above, machine learning system 118 can be configured to operate with a non-optical metrology device, such as an atomic force microscope (AFM), scanning electron microscopes (SEM), and the like, or a combination of an optical and a non-optical metrology device. Thus, machine learning system 118 can generate various types of diffraction signals corresponding to the type of metrology device used. For example, when the metrology device is a SEM, the diffraction signal generated by machine learning system 118 is a SEM signal, such as two-dimensional images or SEM traces.

Additionally, the diffraction signal generated can include characteristic functions of the signal used by the metrology device. For example, during the training process, various order derivatives (e.g., first order, second order . . . $n^{th}$ order derivatives) of the diffraction signal can be used as part of a Marquardt-Levenberg algorithm to optimize the training process.

We claim:

1. A method of examining a structure formed on a semiconductor wafer, the method comprising:
obtaining a first diffraction signal measured using a metrology device;
obtaining a second diffraction signal generated using a machine learning algorithm,
wherein the first and second diffraction signal represent light diffracted from the structure formed on the semiconductor wafer, and
wherein the machine learning algorithm receives as a direct input one or more parameters that characterize a profile of the structure to generate the second diffraction signal as a direct output of the machine learning algorithm;
comparing the first and second diffraction signals; and
when the first and second diffraction signals match within a matching criterion, determining a feature of the structure based on the one or more parameters of the profile used by the machine learning algorithm to generate the second diffraction signal.

2. The method of claim 1, further comprising:
prior to generating the second diffraction signal, training the machine learning algorithm using a set of training input data and a set of training output data,
wherein each of the training input data is a profile of the structure characterized by one or more parameters, and
wherein each of the training output data is a diffraction signal corresponding to the profile of the structure.

3. The method of claim 2, further comprising:
selecting the set of training input data from a range of profiles of the structure.

4. The method of claim 3, further comprising:
dividing the range of profiles into a first partition and at least a second partition,
wherein a first machine learning algorithm is configured and trained for the first partition, and a second machine learning algorithm is configured and trained for the second partition.

5. The method of claim 2, wherein the set of training output data is generated based on the set of training input data using a modeling technique prior to training the machine learning algorithm.

6. The method of claim 5, wherein the modeling technique includes rigorous coupled wave analysis, integral method, Fresnel method, finite analysis, or modal analysis.

7. The method of claim 2, wherein the training output data includes a plurality of dimensions, and further comprising:
transforming the training output data using principal component analysis.

8. The method of claim 7, further comprising:
dividing the dimensions of the training output data into a first partition and at least a second partition,
wherein a first machine learning algorithm is configured and trained for the first partition, and a second machine learning algorithm is configured and trained for the second partition.

9. The method of claim 2, wherein training comprises:
(a) obtaining a training input data;
(b) generating a diffraction signal with the machine learning system algorithm using the training input data;
(c) comparing the diffraction signal with the training output data corresponding to the training input data used to generate the diffraction signal;
(d) when the diffraction signal and the training output data do not match within a matching criterion, repeating (b) and (c) with another training input data.

10. The method of claim 2, wherein training comprises using a back-propagation, radial basis network, support vector, or kernel regression algorithm.

11. The method of claim 1, wherein when the first and second diffraction signals do not match within the matching criterion, comparing the first diffraction signal with another diffraction signal from a library of diffraction signals, and wherein the diffraction signals in the library of diffraction signals were generated using the machine learning algorithm.

12. The method of claim 1, wherein when the first and second diffraction signals do not match within the matching criterion, generating another diffraction signal using the machine learning algorithm to compare to the first diffraction signal.

13. The method of claim 1, wherein the metrology device is an ellipsometer, reflectometer, atomic force microscope, or scanning electron microscope.

14. The method of claim 1, wherein the one or more parameters includes one or more of critical dimension measurements, angle of incidence, n and k values, or pitch.

15. The method of claim 1, wherein the machine learning algorithm is a neural network.

16. A computer-readable storage medium containing computer executable instructions for causing a computer to examine a structure formed on a semiconductor wafer, comprising instructions for:
obtaining a first diffraction signal measured using a metrology device;
obtaining a second diffraction signal generated using a machine learning algorithm,
wherein the first and second diffraction signal represent light diffracted from the structure formed on the semiconductor wafer, and
wherein the machine learning algorithm receives as a direct input one or more parameters that characterize a profile of the structure to generate the second diffraction signal as a direct output of the machine learning algorithm;
comparing the first and second diffraction signals; and
when the first and second diffraction signals match within a matching criterion, a feature of the structure is determined based on the one or more parameters of the profile used by the machine learning algorithm to generate the second diffraction signal.

17. The computer-readable storage medium of claim 16, further comprising instructions for:
prior to generating the second diffraction signal, training the machine learning algorithm using a set of training input data and a set of training output data,
wherein each of the training input data is a profile of the structure characterized by one or more parameters, and
wherein each of the training output data is a diffraction signal corresponding to the profile of the structure.

18. The computer-readable storage medium of claim 17, wherein the set of training output data is generated based on the set of training input data using a modeling technique prior to training the machine learning algorithm.

19. The computer-readable storage medium of claim 17, wherein training comprises:
(a) obtaining a training input data;
(b) generating a diffraction signal with the machine learning algorithm using the training input data;

(c) comparing the diffraction signal with the training output data corresponding to the training input data used to generate the diffraction signal;

(d) when the diffraction signal and the training output data do not match within a matching criterion, repeating (b) and (c) with another training input data.

20. The computer-readable storage medium of claim 16, wherein when the first and second diffraction signals do not match within the matching criterion, comparing the first diffraction signal with another diffraction signal from a library of diffraction signals, and wherein the diffraction signals in the library of diffraction signals were generated using the machine learning algorithm.

21. The computer-readable storage medium of claim 16, wherein when the first and second diffraction signals do not match within the matching criterion, generating another diffraction signal using the machine learning algorithm to compare to the first diffraction signal.

22. A system to examine a structure formed on a semiconductor wafer, the system comprising:

a metrology device configured to measure a first diffraction signal from the structure;

a machine learning algorithm configured to generate a second diffraction signal, wherein the first and second diffraction signal represent light diffracted from the structure formed on the semiconductor wafer, and wherein the machine learning algorithm receives as a direct input one or more parameters that characterize a profile of the structure to generate the second diffraction signal as a direct output of the machine learning algorithm; and a processor configured to compare the first and second diffraction signals, wherein when the first and second diffraction signals match within a matching criterion, a feature of the structure is determined based on the one or more parameters or the profile used by the machine learning algorithm to generate the second diffraction signal.

23. The system of claim 22, wherein prior to generating the second diffraction signal, the machine learning algorithm is trained using a set of training input data and a set of training output data, wherein each of the training input data is a profile of the structure characterized by one or more parameters, and wherein each of the training output data is a diffraction signal corresponding to the profile of the structure.

24. The system of claim 23, wherein the set of training input data is selected from a range of profiles of the structure.

25. The system of claim 24, wherein the range of profiles is divided into a first partition and at least a second partition, and the machine learning algorithm comprises:

a first machine learning algorithm configured and trained for the first partition; and a second machine learning algorithm configured and trained for the second partition.

26. The system of claim 23, wherein the training output data includes a plurality of dimensions, and the dimensions of the training output data is divided into a first partition and at least a second partition, and wherein the machine learning algorithm comprises:

a first machine learning algorithm configured and trained for the first partition; and a second machine learning algorithm configured and trained for the second partition.

27. The system of claim 22, further comprising:

a library of diffraction signals, wherein the diffraction signals in the library were generated using the machine learning algorithm, wherein when the first and second diffraction signals do not match within the matching criterion, the first diffraction signal is compared with another diffraction signal from the library of diffraction signals.

28. The system of claim 22, wherein when the first and second diffraction signals do not match within the matching criterion, the machine learning algorithm generates another diffraction signal to compare to the first diffraction signal.

29. The system of claim 22, further comprising:

a semiconductor fabrication unit coupled to the processor, the semiconductor fabrication unit configured to perform one or more fabrication steps.

* * * * *